United States Patent
Stracener et al.

(10) Patent No.: US 12,423,256 B2
(45) Date of Patent: Sep. 23, 2025

(54) SYSTEMS AND METHODS FOR DESKTOP BUS (D-BUS) CACHING

(71) Applicant: Dell Products, L.P., Round Rock, TX (US)

(72) Inventors: Charles D. Stracener, Carrollton, TX (US); Arun Muthaiyan, Round Rock, TX (US); Krishna K. Kanukurthy, Austin, TX (US); Douglas W. Warzecha, Round Rock, TX (US)

(73) Assignee: Dell Products, L.P., Round Rock, TX (US)

(*) Notice: Subject to any disclaimer, the term of this patent is extended or adjusted under 35 U.S.C. 154(b) by 42 days.

(21) Appl. No.: 18/489,993

(22) Filed: Oct. 19, 2023

(65) Prior Publication Data
US 2025/0130964 A1    Apr. 24, 2025

(51) Int. Cl.
*G06F 13/16* (2006.01)
*G06F 13/36* (2006.01)

(52) U.S. Cl.
CPC .......... *G06F 13/36* (2013.01); *G06F 13/1668* (2013.01)

(58) Field of Classification Search
None
See application file for complete search history.

(56) References Cited

U.S. PATENT DOCUMENTS

| | | | | |
|---|---|---|---|---|
| 6,523,119 B2* | 2/2003 | Pavlin | ............... | G06Q 20/0855 713/192 |
| 10,511,630 B1* | 12/2019 | Weiss | ............... | H04L 63/20 |
| 10,880,347 B1* | 12/2020 | Krishnan | ........... | G06F 16/4387 |
| 2011/0113484 A1* | 5/2011 | Zeuthen | ............... | H04L 63/102 726/19 |
| 2015/0186200 A1* | 7/2015 | Chen | ................... | G06F 3/0659 714/763 |

OTHER PUBLICATIONS

"D-Bus" Wikipedia entry. Available: https://en.wikipedia.org/w/index.php?title=D-Bus&oldid=1271533451 (Year: 2025).*
Cocagne, Tom (Aug. 2012). "DBus Overview". pythonhosted.org. Retrieved Oct. 22, 2015. (Year: 2013).*

* cited by examiner

*Primary Examiner* — Michael Sun
(74) *Attorney, Agent, or Firm* — Fogarty LLP (57) ABSTRACT

Embodiments of the present disclosure provide a system and method to cache Desktop Bus (D-Bus) objects. According to one embodiment, an Information Handling System (IHS) includes a Remote Access Controller (RAC) with computer-executable instructions that cause the RAC to receive a request for a data object from a requester, and determine whether the data object is to be obtained from a cache or directly from the Desktop Bus (D-Bus) service. The instructions further cause the RAC to obtain the requested data object from either the D-Bus service or the cache based upon the determination, and send the obtained data object to the requester in response to the request. The data object is generated by a D-Bus service that communicates through the D-Bus.

15 Claims, 6 Drawing Sheets

SYSTEMS AND METHODS FOR DESKTOP BUS (D-BUS) CACHING

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Modern day IHS administrative management is often provided via baseboard management controllers (BMCs). The baseboard management controller (BMC) generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take certain corrective actions, such as resetting or power cycling the system to get a hung O/S running again. These abilities can often save on the total cost of ownership of an IHS, particularly when implemented in large clusters, such as server farms.

SUMMARY

Embodiments of the present disclosure provide a system and method to cache Desktop Bus (D-Bus) objects. According to one embodiment, an Information Handling System (IHS) includes a Remote Access Controller (RAC) with computer-executable instructions that cause the RAC to receive a request for a data object from a requester, and determine whether the data object is to be obtained from a cache or directly from the Desktop Bus (D-Bus) service. The instructions further cause the RAC to obtain the requested data object from either the D-Bus service or the cache based upon the determination, and send the obtained data object to the requester in response to the request. The data object is generated by a D-Bus service that communicates through the D-Bus.

According to another embodiment, a D-Bus object proxy method includes the steps of receiving, by a Remote Access Controller (RAC), a request for one data object from a requester, the data object being generated by a D-Bus service that communicates through a Desktop Bus (D-Bus), and determining whether the data object is to be obtained from a cache or directly from the D-Bus service. The method may then perform the steps of obtaining the requested data object from either the D-Bus service or the cache based upon the determination, and sending the obtained data object to the requester in response to the request.

According to yet another embodiment, a memory storage device with program instructions stored thereon that, upon execution by an IHS causes it to receive, by a Remote Access Controller (RAC), a request for one data object from a requester, the data object being generated by a D-Bus service that communicates through a Desktop Bus (D-Bus), and determine whether the data object is to be obtained from a cache or directly from the D-Bus service. The instructions then cause the IHS to obtain the requested data object from either the D-Bus service or the cache based upon the determination, and send the obtained data object to the requester in response to the request.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard specifications, such as the Intelligent Platform Management Interface (IPMI) and Systems Management Architecture of Server Hardware (SMASH) for computer system administration. The RAC may include a processor, memory, and an out-of-band network interface separate from and physically isolated from an in-band network interface of the IHS, and/or other embedded resources. In certain embodiments, the RAC may include or may be part of a Remote Access Controller (e.g., a DELL Remote Access Controller (DRAC) or an Integrated DRAC (iDRAC)).

The BMC firmware is normally proprietary and is often developed by the vendor and shipped along with the BMC to the end user. Nevertheless, industry trends have migrated toward custom BMC firmware stacks (e.g., operating systems) that allow the end user greater control over how the BMC operates. OpenBMC is one example standard under which custom BMC firmware stacks may be generated. In general, openBMC is a collaborative open-source Linux distribution for BMCs meant to work across heterogeneous systems that include enterprise, high-performance computing (HPC), telecommunications, and cloud-scale data centers.

Advances in BMC design has led to the development of an Inter-Process Communication (IPC) and remote procedure call (RPC) mechanism, such as Desktop Bus (D-Bus), which typically operate outside the operating-system space. D-Bus is usually provided as a "daemon" process that functions in the background to effectively facilitate exchange of IPC messages between processes that provide various services. Implementation of D-Bus in BMCs are advantageous in that it provides for abstraction of invoking interfaces of a service and responding to interface invocations. Thus, the service may be shielded from, among other things, serialization and deserialization of data shared with other services, thus yielding portable services that may be easily migrated from one platform to another. Because D-Bus is a standard feature provided by the openBMC platform, it may be beneficial to re-use established services on other platforms, such as vendor-based platforms, such as Open Server Manager (OMS) provided by DELL TECHNOLOGIES and vice-versa.

Nevertheless, while implementation of d-bus in BMCs may provide enhanced manageability, transparency, and customization, its implementation has not been without drawbacks. For example, existing D-Bus interfaces and utilities are designed for convenience and not for performance, especially with regard to object interfaces and how their property information is handled. Using d-bus, applications may experience a noticeable decrease in performance, particularly when attempting to fetch more than a handful of objects and their interface's property information. These performance issues scale with the number of objects and/or properties that need to be retrieved. Using a BMC Graphical User Interface (GUI) (e.g., iDRAC GUI) as an example, when the GUI is launched, dozens of backend Redfish requests that fetch large blocks of BMC configuration attribute data typically occur in a relatively short period of time, thus causing d-bus objects to experience significant performance degradation relative to legacy BMC firmware that does not use d-bus for IPC. As will be described in detail herein below, embodiments of the present disclosure provide systems and methods to provide a d-bus object proxy service that provides for the manageability and customization provided by d-bus while ensuring performance metrics are maintained using proxy-based caching techniques and marshaling of data that are transparent to the services using d-bus.

Figure 1A:
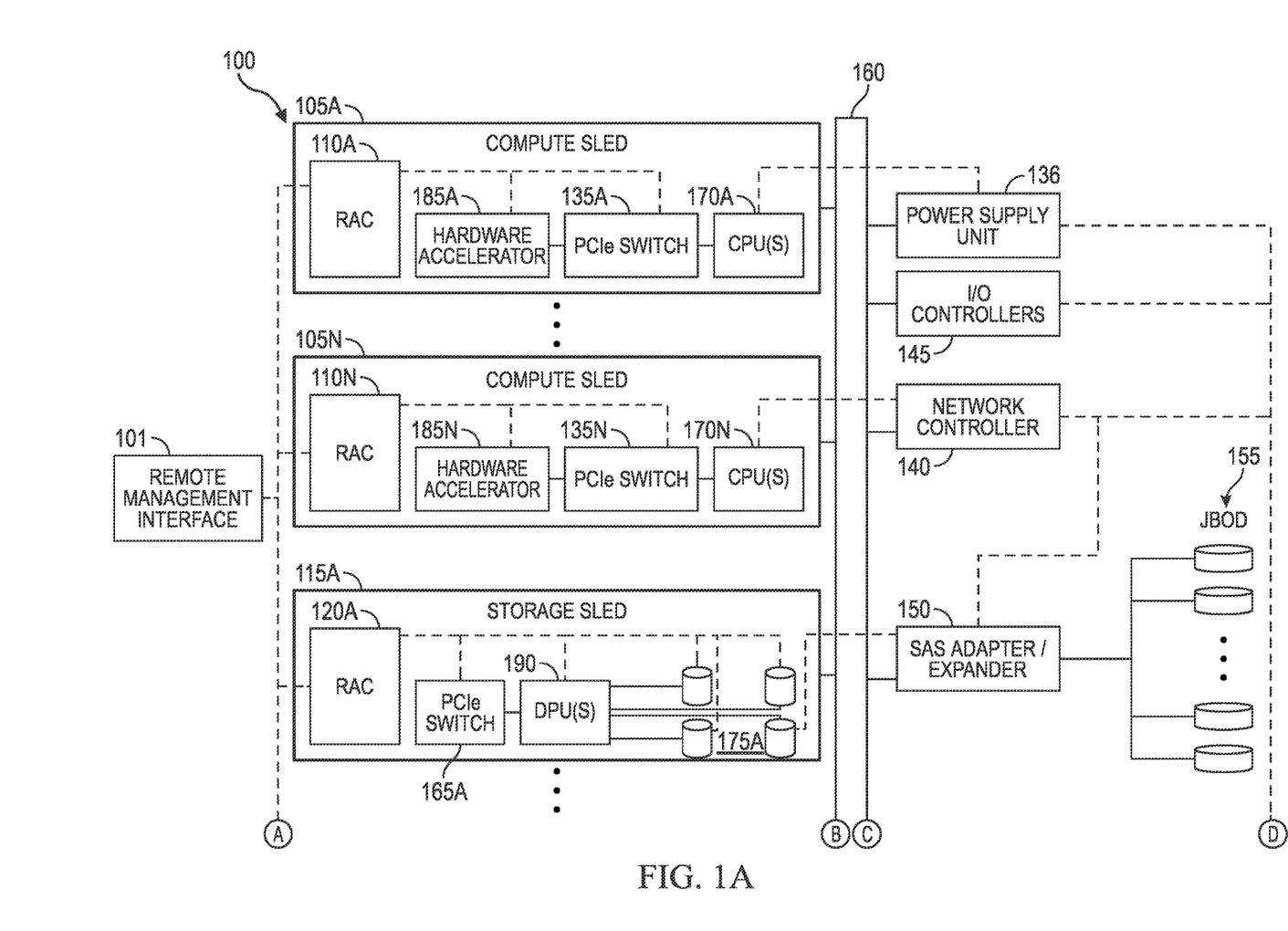
FIGS. 1A and 1B is a block diagram illustrating certain components of a chassis comprising one or more compute sleds and one or more storage sleds that may be configured to implement the systems and methods described according to one embodiment of the present disclosure.
Figure 1B:
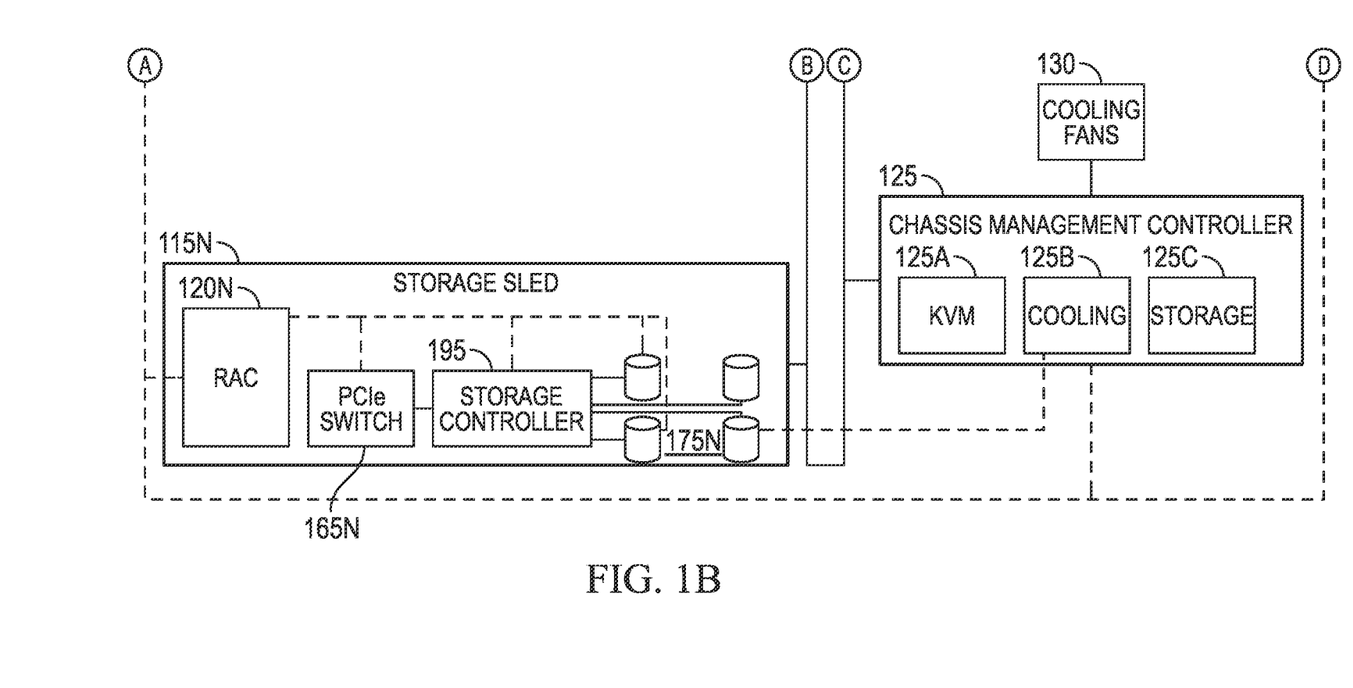

FIGS. 1A and 1B is a block diagram illustrating certain components of a chassis 100 comprising one or more compute sleds 105a-n and one or more storage sleds 115a-n that may be configured to implement the systems and methods described according to one embodiment of the present disclosure. Embodiments of chassis 100 may include a wide variety of hardware configurations in which one or more sleds 105a-n, 115a-n are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removable sleds 105a-n, 115a-n that are installed in the chassis. In addition, once the chassis 100 has been deployed, firmware used by individual hardware components of the sleds 105a-n, 115a-n, or by other hardware components of chassis 100, may be modified in order to update the operations that are supported by these hardware components.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with diverse types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power, and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the sleds 105a-n, 115a-n of the chassis. These high-speed data links may be used to support algorithm implementations that span multiple processing, networking, and storage components of an IHS and/or chassis 100. For instance, computational tasks may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated, such as to adapt the capabilities of the respective hardware accelerators 185a-n to specific computing tasks.

Chassis 100 may be installed within a rack structure that provides at least a portion of the cooling utilized by the sleds 105a-n, 115a-n installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans 130 to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support diverse types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 136.

Figure 2:
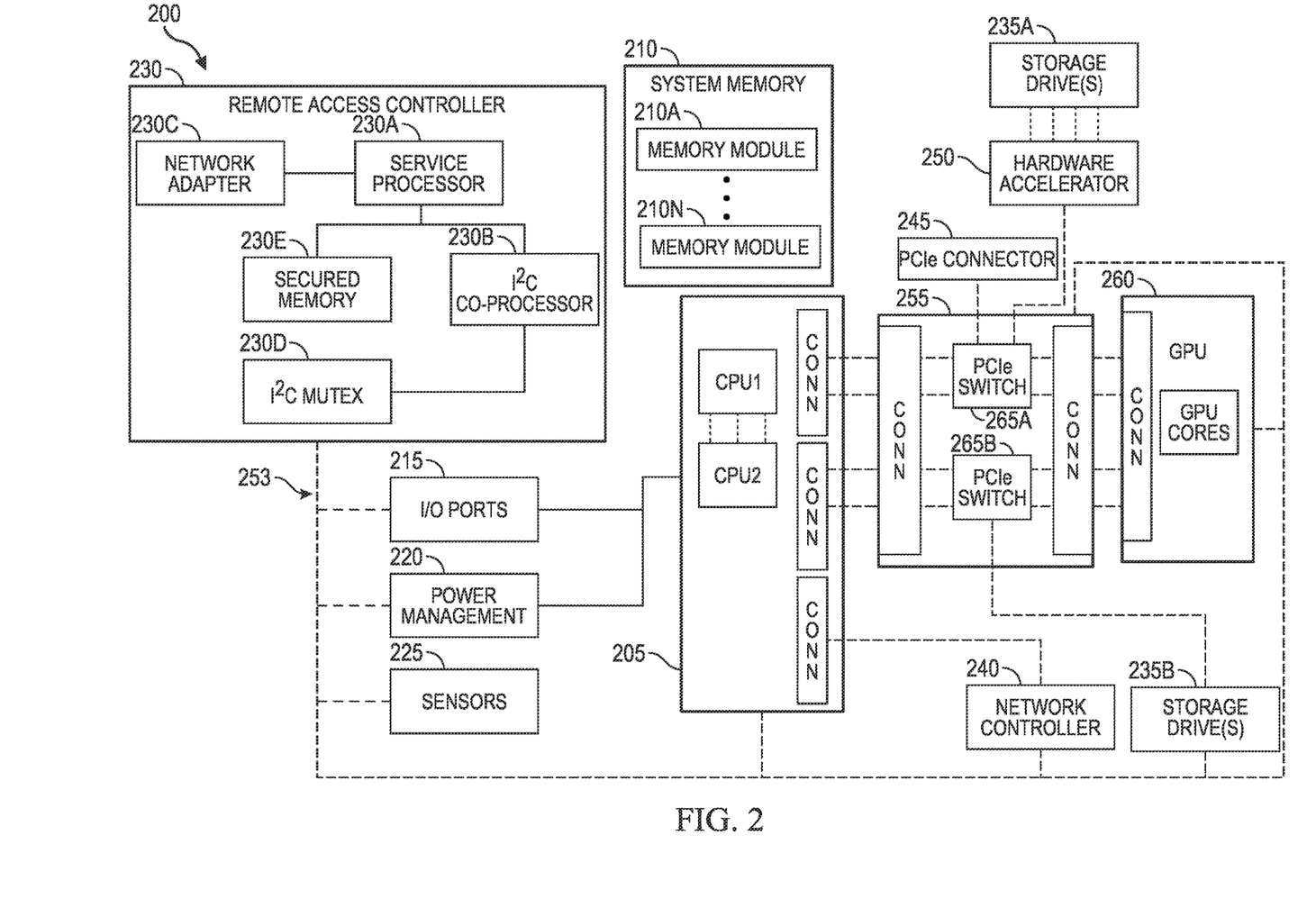
FIG. 2 illustrates an example of an IHS configured to implement systems and methods described herein according to one embodiment of the present disclosure.

In certain embodiments, each individual sled 105a-n, 115a-n-n may be an IHS such as described with regard to IHS 200 of FIG. 2. Sleds 105a-n, 115a-n may individually or collectively provide computational processing resources that may be used to support a variety of e-commerce, multimedia, business, and scientific computing applications, such as artificial intelligence systems provided via cloud computing implementations. Sleds 105a-n, 115a-n are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are expected in the administration and operation of data centers, but it is preferable to avoid any downtime in making such firmware updates. For instance, in updating the firmware of the individual hardware components of the chassis 100, it is preferable that such updates can be made without having to reboot the chassis. As described in additional detail below, it is also preferable that updates to the firmware of individual hardware components of sleds 105a-n, 115a-n be likewise made without having to reboot the respective sled of the hardware component that is being updated.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n and/or of chassis 100. In support of these monitoring and management functions, remote access controllers 110a-n may utilize both in-band and sideband (i.e., out-of-band) communications with various managed components of a respective sled 105a-n and chassis 100. Remote access controllers 110a-n, 120a-n may collect diverse types of sensor data, such as collecting temperature sensor readings that are used in support of airflow cooling of the chassis 100 and the sleds 105a-n, 115a-n. In addition, each remote access controller 110a-n, 120a-n may implement various monitoring and administrative functions related to a respective sled 105a-n, 115a-n, where these functions may be implemented using sideband bus connections with various internal components of the chassis 100 and of the respective sleds 105a-n, 115a-n. As described in additional detail below, in various embodiments, these capabilities of the remote access controllers 110a-n, 120a-n may be utilized in updating the firmware of hardware components of chassis 100 and/or of hardware components of the sleds 105a-n, 115a-n, without having to reboot the chassis or any of the sleds 105a-n, 115a-n.

The remote access controllers 110a-n, 120a-n that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to all of the storage drives 175a-n installed in a chassis 100, or to all of the storage drives 175a-n of a particular model or manufacturer. In some instances, remote management interface 101 may include an inventory of the hardware, software, and firmware of chassis 100 that is being remotely managed through the operation of the remote access controllers 110a-n, 120a-n. The remote management interface 101 may also include various monitoring interfaces for evaluating telemetry data collected by the remote access controllers 110a-n, 120a-n. In some embodiments, remote management interface 101 may communicate with remote access controllers 110a-n, 120a-n via a protocol such the Redfish remote management interface.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, which may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be an integrated component of a DPU 190. The immense data storage and retrieval capabilities provided by such storage sled 115a implementations may be harnessed by offloading storage operations directed as storage drives 175a to a DPU 190, and thus without relying on the main CPU of the storage sled, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100. In certain scenarios, such storage drives 155 may be accessed via a SAS expander 150 that is coupled to the backplane 160 of the chassis 100. The SAS expander 150 may support connections to a number of JBOD (Just a Bunch of Disks) storage drives 155 that, in some instances, may be configured and managed individually and without implementing data redundancy across the various drives 155. The additional storage drives 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of SSDs of the same manufacturer and model. Accordingly, any firmware updates to storage drives 175a-n, 155 require the updates to be applied within each of these topologies being supported by the chassis 100. Despite the substantial number of different storage drive topologies that may be supported by an individual chassis 100, the firmware used by each of these storage devices 175a-n, 155 may be occasionally updated. In some instances, firmware updates may be limited to a single storage drive, but in other instances, firmware updates may be initiated for a large number of storage drives, such as for all SSDs installed in chassis 100.

As illustrated, the chassis 100 of FIG. 1 includes a network controller 140 that provides network access to the sleds 105a-n, 115a-n installed within the chassis. Network controller 140 may include various switches, adapters, controllers, and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated.

Chassis 100 may also include various I/O controllers 145 that may support various I/O ports, such as USB ports that may be used to support keyboard and mouse inputs and/or video display capabilities. Each of the I/O controllers 145 may operate according to firmware instructions that may be occasionally updated. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power supply unit 135, network controller 140 and airflow cooling fans 130 that are available via the chassis 100. As described, the airflow cooling fans 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein according to one embodiment of the present disclosure. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n, 115a-n, or other type of server, such as an 1RU server installed within a 2RU chassis, which is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus. The system memory 210 is coupled to CPUs 205 via one or more memory buses that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to diverse types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line buses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. Each of the PCIe switches 265a-b may operate according to firmware instructions that may be occasionally updated.

Using the available PCIe lanes, the PCIe switches 265a-b may be used to implement a PCIe switch fabric. Also through this switch fabric, PCIe NVMe (Non-Volatile Memory Express) transmission may be supported and utilized in high-speed communications with SSDs, such as storage drives 235a-b, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235b are accessed directly via PCIe switch 265b. In some embodiments, the storage drives 235a-b of IHS 200 may include a combination of both SSD and magnetic disk storage drives. In other embodiments, all of the storage drives 235a-b of IHS 200 may be identical, or nearly identical. In all embodiments, storage drives 235a-b operate according to firmware instructions that may be occasionally updated.

As illustrated, PCIe switch 265a is coupled via a PCIe link to a hardware accelerator 250, such as a DPU, Smart-NIC, GPU and/or FPGA, that may be a connected to the IHS via a removable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, which may be used to implement functions used to support devices coupled to the IHS 200. In some embodiments, the processing cores of hardware accelerator 250 include ARM (advanced RISC (reduced instruction set computing) machine) processing cores. In other embodiments, the cores of the DPUs may include MIPS (microprocessor without interlocked pipeline stages) cores, RISC-V cores, or CISC (complex instruction set computing) (i.e., x86) cores. Hardware accelerator may operate according to firmware instructions that may be occasionally updated.

In the illustrated embodiment, the programmable capabilities of hardware accelerator 250 implement functions used to support storage drives 235a, such as SSDs. In such storage drive topologies, hardware accelerator 250 may implement processing of PCIe NVMe communications with storage drives 235a, thus supporting high-bandwidth connections with the storage drives. Hardware accelerator 250 may also include one or more memory devices used to store program instructions executed by the processing cores and/or used to support the operation of storage drives 235a such as in implementing cache memories and buffers utilized in support of high-speed operation of these storage drives, and in some cases may be used to provide high-availability and high-throughput implementations of the read, write and other I/O operations that are supported by these storage drives 235a. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include one or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs 260 may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to IHS. Through couplings to PCIe connectors 245, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and management tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230a, or specialized microcontroller, which operates management software that supports remote monitoring and administration of IHS 200. The management operations supported by remote access controller 230 may be remotely initiated, updated, and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 230 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 253. In some embodiments, the remote access controller 230 may additionally or alternatively use MCTP messaging to transmit Vendor Defined Messages (VDMs) via the in-line PCIe switch fabric supported by PCIe switches 265a-b. In some instances, the sideband management connections supported by remote access controller 230 may include PLDM (Platform Level Data Model) management communications with the managed devices 205, 235a-b, 240, 250, 255, 260 of IHS 200.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 230 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 253. For instance, messages utilized in device and/or system management may be transmitted using I2C sideband bus 253 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 235a-b, 240, 250, 255, 260 of IHS 200 are coupled to the CPUs 205, either directly or indirectly, via in-line buses that are separate from the I2C sideband bus 253 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement an I2C bus interface used to support communications with managed hardware components 205, 235a-b, 240, 250, 255, 260 of HIS 200. In some embodiments, the I2C co-processor 230b may be an integrated circuit on the same die as the service processor 230a, such as a peripheral system-on-chip feature that may be provided by the service processor 230a. The sideband I2C bus 253 is illustrated as single line in FIG. 2. However, sideband bus 253 may be comprised of multiple signaling pathways, where each may be comprised of a clock line and data line that couple the remote access controller 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
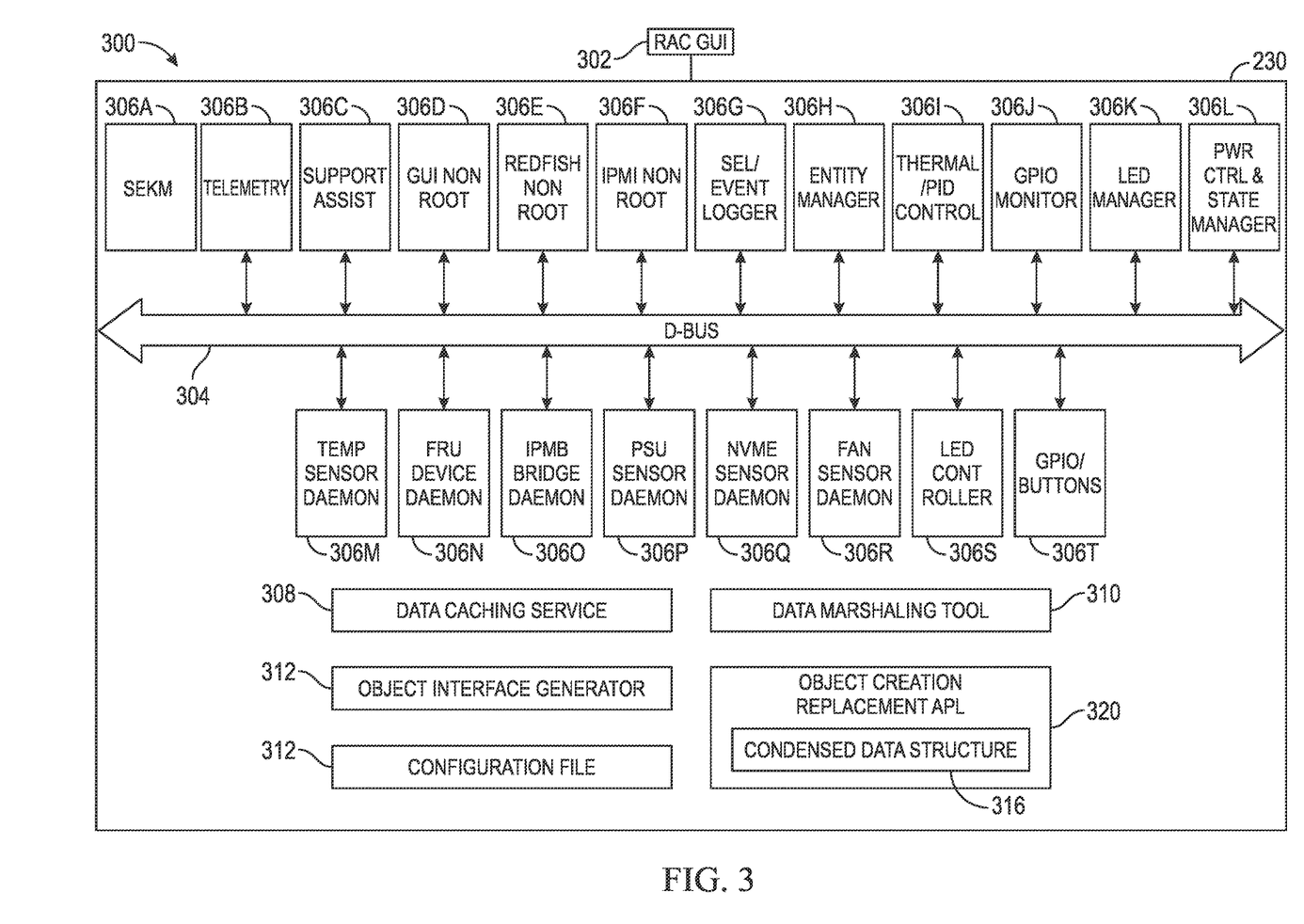
FIG. 3 is a diagram illustrating several components of a D-Bus object proxy system that may be used to enhance performance of services that utilize IPC, such as D-Bus according to one embodiment of the present disclosure.

FIG. 3 is a diagram illustrating several components of a D-Bus object proxy system 300 that may be used to enhance performance of services that utilize IPC, such as D-Bus according to one embodiment of the present disclosure. The D-Bus object proxy system 300 includes a RAC 230 that may be used to manage the operation of an IHS 200 using a RAC Graphical User Interface (GUI) 302. The RAC 230 includes a D-Bus process 304 that provides inter process communications among multiple services 306a-t (collectively 306). According to embodiments of the present disclosure, the RAC 230 is configured with a data caching service 308, a data marshaling tool 310, and an object interface generator 312 that improve the performance of services 306 that communicate with each other through the D-Bus 304. Each of the data caching service 308, data marshaling tool 310, and object interface generator 312 are embodied as instructions stored in a memory and executed by a processor configured in the RAC 230.

The services 306 using the D-Bus 306 may be any suitable type. As shown, services 306 that use the D-Bus 304 may include a Secure Enterprise Key Manager (SEKM) module 306a, a telemetry module 306b, a support assist module 306c, a non-root GUI module 306d, a non-root redfish module 306e, an xx (IPMI) module 306f, a SEL/Event logger module 306g, an entity manager 306h, a thermal/PID control module 306i, a GPIO monitor 306j, a LED manager 306k, a power control and state manager 306l, a temp sensor daemon 306m, a Field Replaceable Unit (FRU) device daemon 306n, an IPMB bridge daemon 306o, a Power Supply Unit (PSU) sensor daemon 306p, an NVMe sensor daemon 306q, a fan sensor daemon 306r, an LED controller module 306s, and a GPIO/Buttons module 306t. It should be appreciated that other embodiments may have additional, fewer, or different services 306 than what is shown and described herein.

For the purposes of this disclosure, the term "RAC GUI" may refer broadly to systems that are configured to couple to a management controller, such as a RAC 230, and issue management instructions for an information handling system (e.g., computing device) that is being managed by the management controller. One example of such a system management console is the DELL OpenManage Enterprise (OME) systems management console. In various embodiments, management consoles may be implemented via specialized hardware and/or via software running on a standard information handling system. In one embodiment, a system management console may be deployed on a secure virtual machine (VM), such as a VMWARE Workstation appliance.

The data caching service 308 generates and maintains a cache of certain data objects generated by the services 306, thus alleviating the need of accessing the D-Bus 304 each time those data objects need to be accessed. For example, the data caching service 308 may use the object interface generator 312 to create API wrappers that function as intermediaries between the D-Bus 304 and services 306 that generate the data objects or applications that consume those data objects. Certain data objects may be cached while other data objects are not. The proxy (e.g., reflection) of D-Bus property information allows the RAC 230 to maintain or, in most cases, improve performance while keeping the D-Bus functionality as an alternative to legacy models (e.g., socket-based models) that were not implemented using D-Bus 304. Additionally, each cache segment is configurable for Linux user/group permissions and mirrors the D-Bus property security settings, so only permitted users can set property information. To provide a particular real-world implementation, when using the data caching service 308, the RAC 230 homepage load time was reduced from approximately 5.0 seconds to 3.5 seconds, Secure Copy Protocol (SCP) export time was reduced from approximately 50.0 seconds to 25.0 seconds, User Datagram Protocol (UDP) load time was reduced from approximately 2.0 minutes to 20 seconds, and the RAC 230 boot time was reduced by approximately 20.0 seconds. Additionally, the conversion of one of object heavy service reduced the memory size (e.g., footprint) by approximately 8.0 Megabytes.

The D-Bus object proxy system 300 also include a configuration file 314 that stores information about whether a data object is to be cached or not. In one embodiment, the configuration file 314 is used at build time to specify which data objects are cached. In other embodiments, the configuration file 314 may be accessed at other times, such as at run time, to specify which data objects are to be cached. For example, a data object representing a critical parameter (e.g., CPU temperature) of the IHS 200 may be restricted from being cached, while a data object representing a less important parameter (e.g., informational message) of the IHS 200 may be allowed to be cached. The object interfaces generated by the object interface generator 312 may be specified as D-Bus only (caching not allowed), D-Bus and cache (both D-Bus and caching are allowed), or cache only (caching is enforced) based upon information included in the configuration file 314. For example, If the RAC 230 has a certain attributed (e.g., CfgStrAttribute) configured for cache only, but the configuration file 314 has it configured for D-Bus only, then the API's will fetch from the cache or D-Bus depending on the information in the configuration file 314. Additional details regarding the structure and function of the data caching service 308 will be described in detail herein below with reference to FIG. 4.

The data marshaling tool 310 provides a build-time object creation replacement API 320 that does not generate D-Bus formatted objects, but rather creates a condensed data structure 316 (e.g., snapshot) of the D-Bus interface's properties void of some, most, or all metadata that would otherwise require large amounts of memory to store and transmit. For example, D-Bus interface properties carry some memory overhead that can add up quickly depending on the number of properties and objects. An object with a single interface and a single property carries a 200 byte overhead, and scales with each additional property. The payload of the object is carried within the owning process, usually around 800 bytes for a single property and interface.

For services that generate many objects, the memory size (e.g., footprint) can become significant. As an example, a service that generates 15,000 objects, each containing 3-12 properties may cause the broker portion of memory to be up to 3.0 Megabytes in size while the process portion can be up to 5.0 Megabytes in size. To solve this size (e.g., bloat) issue, the data marshaling tool 310 creates the condensed data structure 316 that is a representation of the D-Bus interface's property information and property values that contains little or no meta-data and uses guaranteed ordering (based on code generation) to marshal the data to help in minimizing the overall memory requirements of each object. For example, the condensed data structure 316 may include a comma delimited list of attributes, or other structured format, in which each attribute is specified to exist at a certain specified location within the list. Consumers, such as the RAC GUI 302 possess knowledge of this structured format so that it may correctly parse it to obtain the information that was put into the condensed data structure 316.

The condensed data structure 316 generated by the data marshaling tool 310, using the object interface generator 312, allows for easy configuration between full D-Bus objects or the marshaled representation of the object. Clients using the object creation replacement API 320 do not need to be aware of the current mode of the object. The object creation replacement API 320 will intelligently return the object regardless of its mode or location. In one embodiment, the configuration file 314 used during code generation to create the interface template is leveraged to create the 320 using a C++ object. This local object has accessors/mutators of each property for easy manipulation and added APIs for quick marshaling and unmarshalling of the data. The result is an object the D-Bus service can interact with just as if it was a full D-Bus object. Additionally, code generated client APIs understand how to process this data, just as if it was a D-Bus object. The object creation replacement API 320 decides on how to process the request. The interface configuration file 314 can be toggled between a full D-Bus object or the condensed data structure 316 with little or no impact to the services or clients that interact with it. Build-time and runtime toggles are available for flexibility in supporting unique platform constraints.

Figure 4:
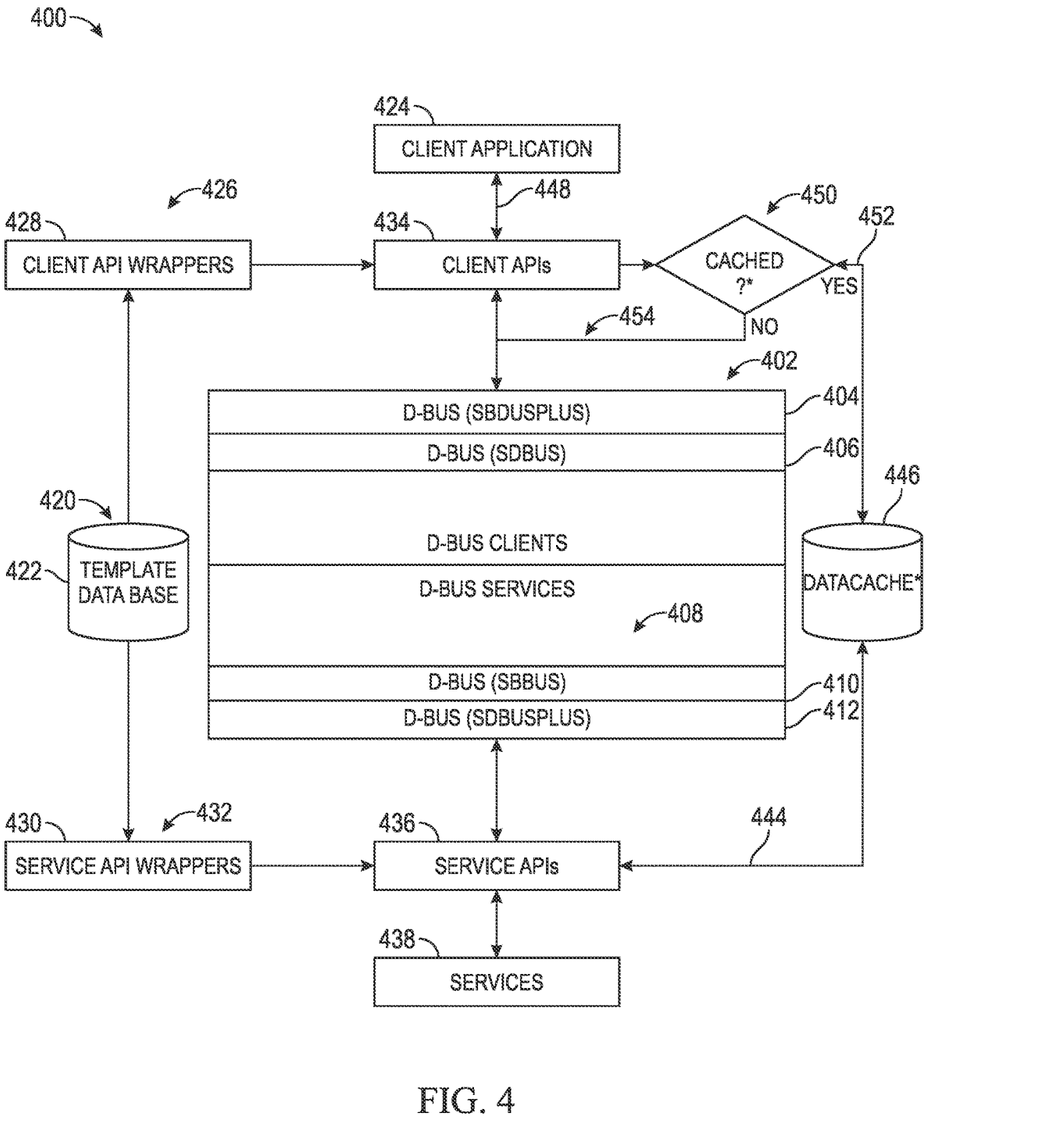
FIG. 4 illustrates an example D-Bus object proxy method showing how several components may be used to cache D-Bus data objects for enhanced performance according to one embodiment of the present disclosure.

FIG. 4 illustrates an example D-Bus object proxy method 400 showing how several components may be used to cache D-Bus data objects for enhanced performance according to one embodiment of the present disclosure. Additionally or alternatively, the D-Bus object proxy method 400 may be performed in whole or in part, by the D-Bus proxy system 300 as shown and described above with reference to FIG. 3. The D-Bus 304 is shown as two entities, namely a client D-Bus 402 indicating those services 306 that function as consumers of data objects, and a producer D-Bus 408 indicating those services 306 that function as producers of data objects. Additionally, each of the client D-Bus 402 and producer D-Bus 408 may include a sdbusplus layer 404, 412 that functions as an interface to a base D-Bus layer 406, 410.

The D-Bus object proxy method 400 initially at step 420 generates a template database 422 that describes how data objects will be presented to a client application 424, such as RAC GUI 302, and shares the specified locations with the requester when the requester signs up to receive the condensed data structure in the future. In one embodiment, the template database 422 is built using a Yet Another Multi-column Layout (YAML) platform due to its ability to structure data in a relatively small size. In another embodiment, the D-Bus object proxy method 400 may generate the template database 422 according to information included in the configuration file 314 at build time or run time.

At step 426, the D-Bus object proxy method 400, using the template database 422 and client API wrappers 428, form client APIs 434 to provide interfaces for the client application 424. Additionally, the D-Bus object proxy method 400, using the template database 422 and service API wrappers 430, form service APIs 434 to provide interfaces for one or more services 438 at step 432.

At step 444, the service APIs 436 cache data objects in a data cache 446 based upon whether they are D-Bus only (e.g., caching not allowed), D-Bus and cache (e.g., both D-Bus and caching are allowed), or cache only (e.g., caching is enforced) as specified in the configuration file 314. In one embodiment, the D-Bus object proxy method 400 may store the data objects in the data cache 446 using the data marshaling tool 310 as will be described in detail herein below with reference to FIG. 5. When the client application 424 requests access to one or more data objects via the client APIs 434 at step 448, the D-Bus object proxy method 400 determines whether the data objects are to be retrieved from the data cache 446, or directly from the services 306 at step 450. Those data objects that are specified to be cached are retrieved from the data cache 446 at step 452, while those data objects that are specified to not be cached are retrieved directly from the services 306 at step 454.

The aforedescribed process may be performed continually during operation of the RAC 230. Nevertheless, when use of the D-Bus object proxy method 400 is no longer needed or desired, the D-Bus object proxy method 400 ends.

Figure 5:
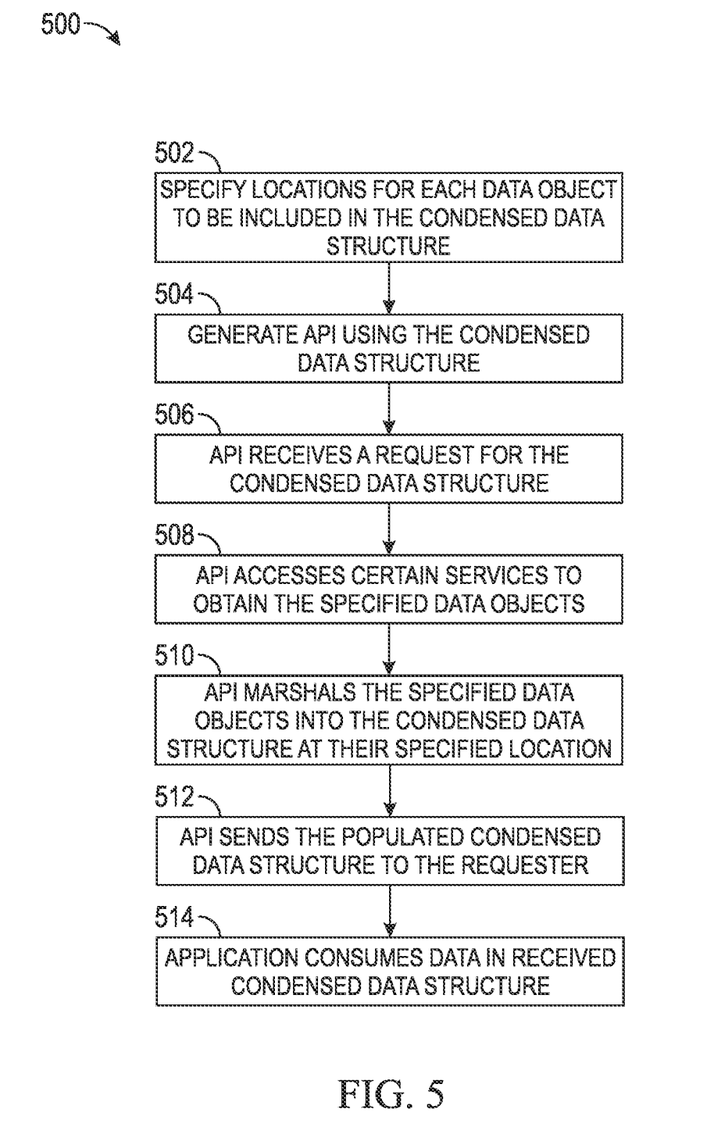
FIG. 5 illustrates an example D-Bus object marshaling method showing how several components may be used to marshal D-Bus data objects for enhanced performance according to one embodiment of the present disclosure.

FIG. 5 illustrates an example D-Bus object marshaling method 500 showing how several components may be used to marshal D-Bus data objects for enhanced performance according to one embodiment of the present disclosure. Additionally or alternatively, the D-Bus object proxy method 400 may be performed in whole or in part, by the data marshaling tool 310 as shown and described above with reference to FIG. 3. For example, the D-Bus object marshaling method 500 may be used to Marshall data objects that are stored in the data cache 446. Additionally, the D-Bus object marshaling method 500 may be used to Marshall data objects that are provided to the client application 424 via the client APIs 434.

Initially at step 502, the D-Bus object marshaling method 500 specifies locations for each data object to be included in the condensed data structure 316, and share the specified locations (e.g., location map) with one or more requesters who are to request the condensed data structure 316 in the future. For example, the locations of data objects may be specified according to the needs of the RAC GUI 302, such as its homepage web interface, which displays certain attributes (e.g., data objects) as summary information about the IHS 200 managed by the RAC 230. Step 502 may be performed whenever a requester wants to configure the D-Bus object marshaling method 500 to receive a certain set (e.g., plurality) of data objects at ongoing instances throughout the operation of the D-Bus object marshaling method 500.

Thereafter at step 504, the D-Bus object marshaling method 500 generates an API which can be used by consumers for accessing the condensed data structure 316. In one embodiment, the API may be a client API 434 that provides access of the client application 424 to the condensed data structure 316. In another embodiment, the API may be a service API 436 that may store the condensed data structure 316 in the data cache 446.

At some later point in time, the generated API receives a request for the data structure, such as from the client application, at step 506. For example, the client application may be the RAC GUI 302 such as described above with reference to FIG. 3. At step 508, the API accesses certain services 306 to obtain the specified data objects, and at step 510, it marshals the specified data objects into the condensed data structure 316 at their specified location. The API then sends the populated condensed data structure 316 to the requester, such as RAC GUI 302 at step 512. The requester at step 514 then consumes the data objects in the received condensed data structure 316. The requester has knowledge of the locations of each data object because it was provided to them earlier at step 502. For example, the requester may parse the condensed data structure 316 to obtain each data object from its specified location.

Steps 504-514 may be performed each time the generated API receives a request for the condensed data structure 316 from the API. Nevertheless, when use of the D-Bus object proxy method 400 is no longer needed or desired, the D-Bus object proxy method 400 ends.

Although FIGS. 4 and 5 describes example methods 400 and 500 that may be performed to enhance the performance of D-Bus related processes, the features of the disclosed processes may be embodied in other specific forms without deviating from the spirit and scope of the present disclosure. For example, certain steps of the disclosed methods 400 and 500 may be performed sequentially, or alternatively, they may be performed concurrently. As another example, the methods 400 and 500 may perform additional, fewer, or different operations than those operations as described in the present example. As yet another example, the steps of the processes described herein may be performed by a manual or executable process other than the D-Bus object proxy system 300 as described above.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
a Remote Access Controller (RAC) comprising at least one processor and at least one memory coupled to the at least one processor, the at least one memory having program instructions stored thereon that, upon execution by the at least one processor, cause the RAC to:
receive a request for one data object from a requester, the data object being generated by a D-Bus service that communicates through a Desktop Bus (D-Bus);
generate an Application Program Interface (API) wrapper that comprises an interface between the requester and the D-Bus service;
communicate, by the API wrapper, with the D-Bus using a D-Busplus layer;
determine whether the data object is to be obtained from a cache or directly from the D-Bus service;
obtain the requested data object from either the D-Bus service or the cache based upon the determination; and
send the obtained data object to the requester in response to the request.

2. The IHS of claim 1, wherein the API wrapper comprises logic to perform the determination of whether the data object is cached or not.

3. The IHS of claim 1, wherein the instructions, upon execution, cause the RAC to obtain information associated with whether the data object is to be cached from a configuration file stored in the at least one memory.

4. The IHS of claim 3, wherein the instructions, upon execution, cause the RAC to obtain the information during at least one of a build time or a run time of the instructions.

5. The IHS of claim 1, wherein the instructions, upon execution, cause the RAC to marshal data included in each of a plurality of the data objects into a condensed data structure by removing a D-Bus format from the data, and storing the data at specified locations in the condensed data structure.

6. The IHS of claim 5, wherein the instructions, upon execution, cause the RAC to share the specified locations with the requester when the requester signs up to receive the condensed data structure.

7. A D-Bus object proxy method comprising:
receiving, by a Remote Access Controller (RAC), a request for one data object from a requester, the data object being generated by a D-Bus service that communicates through a Desktop Bus (D-Bus);
generating an Application Program Interface (API) wrapper that comprises an interface between the requester and the D-Bus service;
communicating, by the API wrapper, with the D-Bus using a D-Busplus layer;
determining whether the data object is to be obtained from a cache or directly from the D-Bus service, wherein the API wrapper comprises logic to perform the determination of whether the data object is cached or not;
obtaining the requested data object from either the D-Bus service or the cache based upon the determination; and
sending the obtained data object to the requester in response to the request.

8. The D-Bus object proxy method of claim 7, further comprising obtaining information associated with whether the data object is to be cached from a configuration file stored in at least one memory.

9. The D-Bus object proxy method of claim 8, further comprising obtaining the information during at least one of a build time or a run time of the instructions.

10. The D-Bus object proxy method of claim 7, further comprising marshaling data included in each of a plurality of the data objects into a condensed data structure by removing a D-Bus format from the data, and storing the data at specified locations in the condensed data structure.

11. The D-Bus object proxy method of claim 10, further comprising sharing the specified locations with the requester when the requester signs up to receive the condensed data structure.

12. A memory storage device having program instructions stored thereon that, upon execution by one or more processors of a client Information Handling System (IHS), cause the client IHS to:
receive, by a Remote Access Controller (RAC), a request for one data object from a requester, the data object being generated by a D-Bus service that communicates through a Desktop Bus (D-Bus);
generate an Application Program Interface (API) wrapper that comprises an interface between the requester and the D-Bus service;
communicate, by the API wrapper, with the D-Bus using a D-Busplus layer;
determine whether the data object is to be obtained from a cache or directly from the D-Bus service, wherein the API wrapper comprises logic to perform the determination of whether the data object is cached or not;
obtain the requested data object from either the D-Bus service or the cache based upon the determination; and
send the obtained data object to the requester in response to the request.

13. The memory storage device of claim 12, wherein the instructions, upon execution, cause the RAC to obtain information associated with whether the data object is to be cached from a configuration file stored in the memory storage device.

14. The memory storage device of claim 13, wherein the instructions, upon execution, cause the RAC to obtain the information during at least one of a build time or a run time of the instructions.

15. The memory storage device of claim 12, wherein the instructions, upon execution, cause the RAC to marshal data included in each of a plurality of the data objects into a condensed data structure by removing a D-Bus format from the data, and storing the data at specified locations in the condensed data structure, and share the specified locations with the requester when the requester signs up to receive the condensed data structure.

* * * * *